US012789398B2

(12) United States Patent
Matsuo

(10) Patent No.: US 12,789,398 B2
(45) Date of Patent: Nov. 10, 2026

(54) COLLABORATIVE ROBOT

(71) Applicant: DAIHEN CORPORATION, Osaka (JP)

(72) Inventor: Hideki Matsuo, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 0 days.

(21) Appl. No.: 19/314,565

(22) Filed: Aug. 29, 2025

(65) Prior Publication Data

US 2026/0091518 A1 Apr. 2, 2026

(30) Foreign Application Priority Data

Sep. 30, 2024 (JP) ................................ 2024-170695

(51) Int. Cl.
*B25J 19/00* (2006.01)
*B25J 9/00* (2006.01)

(52) U.S. Cl.
CPC ............. *B25J 19/00* (2013.01); *B25J 9/0009* (2013.01)

(58) Field of Classification Search
CPC ......... B25J 9/0009; B25J 19/00; B23K 9/133; B23K 9/12
See application file for complete search history.

(56) References Cited

U.S. PATENT DOCUMENTS 7,810,765 B2 * 10/2010 Burlot .................. H02G 3/0481 248/75
9,764,483 B2 * 9/2017 Okahisa ................... B25J 18/00
D881,251 S * 4/2020 Abe ............................. D15/199
D905,774 S * 12/2020 Inoue ........................... D15/199
D911,408 S * 2/2021 Okada .......................... D15/199
11,040,457 B2 * 6/2021 Carruthers ............... B25J 19/00
2008/0271561 A1 * 11/2008 Ohara .................. B25J 19/0025 74/490.01
2020/0318726 A1 * 10/2020 Horigome ................ B25J 9/102
2021/0387361 A1 * 12/2021 Grella .................. B25J 19/0025

FOREIGN PATENT DOCUMENTS

EP 1 974 874 A1 10/2008
WO WO 2007/026438 A1 3/2007
WO WO-2024048165 A1 * 3/2024 ............. B23K 9/133

OTHER PUBLICATIONS

Extended European Search Report issued in European Application No. 25197463.0, dated Feb. 12, 2026 (10 pages).

* cited by examiner

*Primary Examiner* — Randell J Krug
(74) *Attorney, Agent, or Firm* — Crowell & Moring LLP

(57) ABSTRACT

In a collaborative robot, a shoulder includes a plurality of attachment holes for attaching an auxiliary device at two different positions. The plurality of attachment holes includes a plurality of first attachment holes on one side of the shoulder and a plurality of second attachment holes on another side of the shoulder with a first virtual plane extending therebetween. The plurality of attachment holes is holes selected from either the plurality of first attachment holes or the plurality of second attachment holes and to which the auxiliary device is attached.

4 Claims, 9 Drawing Sheets

COLLABORATIVE ROBOT

RELATED APPLICATIONS

The present application claims priority from Japanese patent application JP 2024-170695 filed on Sep. 30, 2024, the entire content of which is hereby incorporated by reference into this application.

BACKGROUND OF THE INVENTION

1. Field of the Invention

The present invention relates to a collaborative robot.

2. Description of the Related Art

This type of technique includes a collaborative robot which can be used in a state where a base is fixed to a floor surface and in a state where the base is fixed to a ceiling surface as disclosed for example, in WO 2007/026438 A1. In this collaborative robot, an auxiliary device is mounted to a shoulder. The collaborative robot can be used without changing the mount position of the auxiliary device since the auxiliary device is mounted on the same position of the shoulder regardless of whether the base is fixed to the floor surface or to the ceiling surface.

SUMMARY OF THE INVENTION

However, given that the direction from the floor surface to the ceiling surface is an upward direction and its opposite direction is a downward direction, when the collaborative robot is used with its base fixed to the ceiling surface, the auxiliary device will be located below the shoulder. In addition, rotation of a lower arm, which is rotatable about a second axis, will cause the shoulder that is pivotally attached to the lower arm and the auxiliary device that is attached to the shoulder to simultaneously rotate. Accordingly, when the lower arm rotates with the base fixed to the ceiling surface, the auxiliary device may interfere with an operator working under the auxiliary device or the like. Thus, it is assumed that the working space around the collaborative robot may be limited.

The present invention has been made in view of the foregoing, and provides a collaborative robot in which, even when the auxiliary device attached to the shoulder rotates along with the rotation of the lower arm, it is possible to reduce the likelihood that the auxiliary device will limit the working space around the collaborative robot.

In view of the above-described problem, the collaborative robot according to the present invention includes: a turning base that is pivotally attached to a base so as to be rotatable about a first axis; a lower arm that is pivotally attached to the turning base so as to be rotatable about a second axis; a shoulder that is pivotally attached to the lower arm so as to be rotatable about a third axis that is parallel to the second axis; an upper arm that is pivotally attached to the shoulder so as to be rotatable about a fourth axis along a longitudinal direction; a support arm that is pivotally attached so as to be rotatable about a fifth axis perpendicular to the fourth axis at a distal end portion of the upper arm; and a distal end member that is rotatable about a sixth axis along the longitudinal direction with respect to the support arm. An end effector is attachable to the distal end member. An auxiliary device is connected to the end effector via a cable disposed along the upper arm. A virtual plane including the third axis is set as a first virtual plane, with a line perpendicular to the third axis and the fourth axis being a normal line. In the collaborative robot, the shoulder includes a plurality of attachment holes for attaching the auxiliary device at two different positions; the plurality of attachment holes includes a plurality of first attachment holes on one side of the shoulder and a plurality of second attachment holes on another side of the shoulder with the first virtual plane extending therebetween; and the plurality of attachment holes is holes selected from either the plurality of first attachment holes or the plurality of second attachment holes and to which the auxiliary device is attached.

According to the present invention, it is possible to select the plurality of attachment holes formed on the shoulder and attach the auxiliary device to the shoulder at two different positions. Specifically, given that the direction from the floor surface to the ceiling surface is an upward direction and its opposite direction is a downward direction, when the collaborative robot is installed on the floor surface, the openings of the first attachment holes formed on the shoulder face upward, and thus the auxiliary device can be attached to the upper side of the shoulder using the first attachment holes. On the other hand, when the collaborative robot is installed on the ceiling surface, the openings of the second attachment holes formed on the shoulder face upward, and thus the auxiliary device can be attached to the upper side of the shoulder using the second attachment holes. As described above, by selecting either the plurality of first attachment holes or the plurality of second attachment holes depending on the surface (floor surface or ceiling surface) for installation of the collaborative robot, the auxiliary device can be attached to the upper side of the shoulder. With this configuration, whether the collaborative robot is installed on the floor surface or on the ceiling surface, the auxiliary device may be installed on the upper side of the shoulder. Consequently, even when the lower arm and the shoulder of the collaborative robot rotate about the second axis and about the third axis, respectively, it is possible to reduce the limitation of the working space caused by the auxiliary device on the lower side of the shoulder.

In a preferred aspect, the plurality of first attachment holes and the plurality of second attachment holes are provided at plane-symmetric positions to the first virtual plane extending therebetween.

According to this aspect, the cable connecting the auxiliary device attached to the first attachment holes or the second attachment holes and the end effector can have a substantially constant length. Thus, between when the auxiliary device is attached to the first attachment holes and when the auxiliary device is attached to the second attachment holes, it is possible to reduce the likelihood of variations in the operability of the collaborative robot resulting from the cable swaying around.

In a further preferred aspect, the plurality of first attachment holes and the plurality of second attachment holes each include a pair of attachment holes between which a second virtual plane that includes the third axis and is perpendicular to the first virtual plane extends, and a pair of attachment holes between which a third virtual plane that includes the fourth axis and is perpendicular to the first virtual plane extends.

According to this aspect, even when the shoulder and the upper arm of the collaborative robot rotate about the third axis and the fourth axis, respectively, it is possible to stably maintain the state of the auxiliary device being attached to the first attachment holes or the second attachment holes.

In a further preferred aspect, the shoulder is a casting with a raised portion that is raised from a surface of the shoulder. The raised portion includes a side surface and a top surface that are casting surfaces. The raised portion includes a boundary portion between the side surface and the top surface, the boundary portion being rounded. The raised portion includes a counterbored portion on the top surface thereof. The plurality of attachment holes is formed in the counterbored portion.

According to this aspect, since the boundary portion between the side surface and the top surface of the raised portion is a rounded casting surface, it is possible to ensure operator safety when in contact with the raised portion while using the collaborative robot. In addition, since the raised portion includes a counterbored portion on the top surface thereof, the attachment accuracy of the auxiliary device can be ensured.

According to the present invention, even when the auxiliary device attached to the shoulder rotates along with the rotation of the lower arm, it is possible to reduce the likelihood that the auxiliary device will limit the working space around the collaborative robot.

DETAILED DESCRIPTION OF THE PREFERRED EMBODIMENTS

Embodiment

Hereinafter, an embodiment of the present invention will be described in detail with reference to the drawings from FIG. 1A to FIG. 5B. It is noted that the following embodiment describes one embodiment of the present invention and therefore should not be considered as limiting the technical scope of the present invention.

<Apparatus Configuration>

Figure 1A:
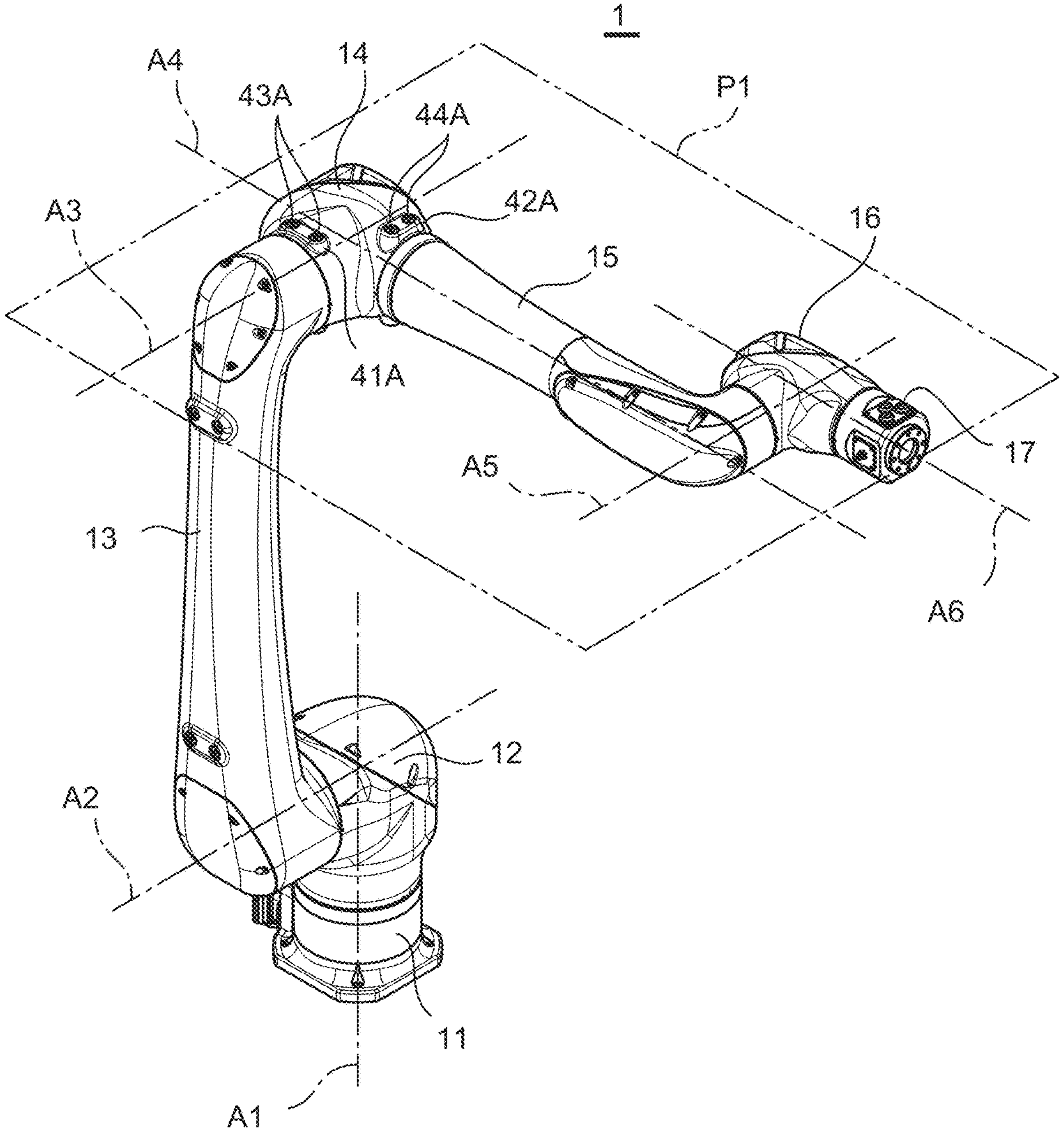
FIG. 1A and FIG. 1B are perspective views of a collaborative robot according to the present embodiment.
Figure 1B:
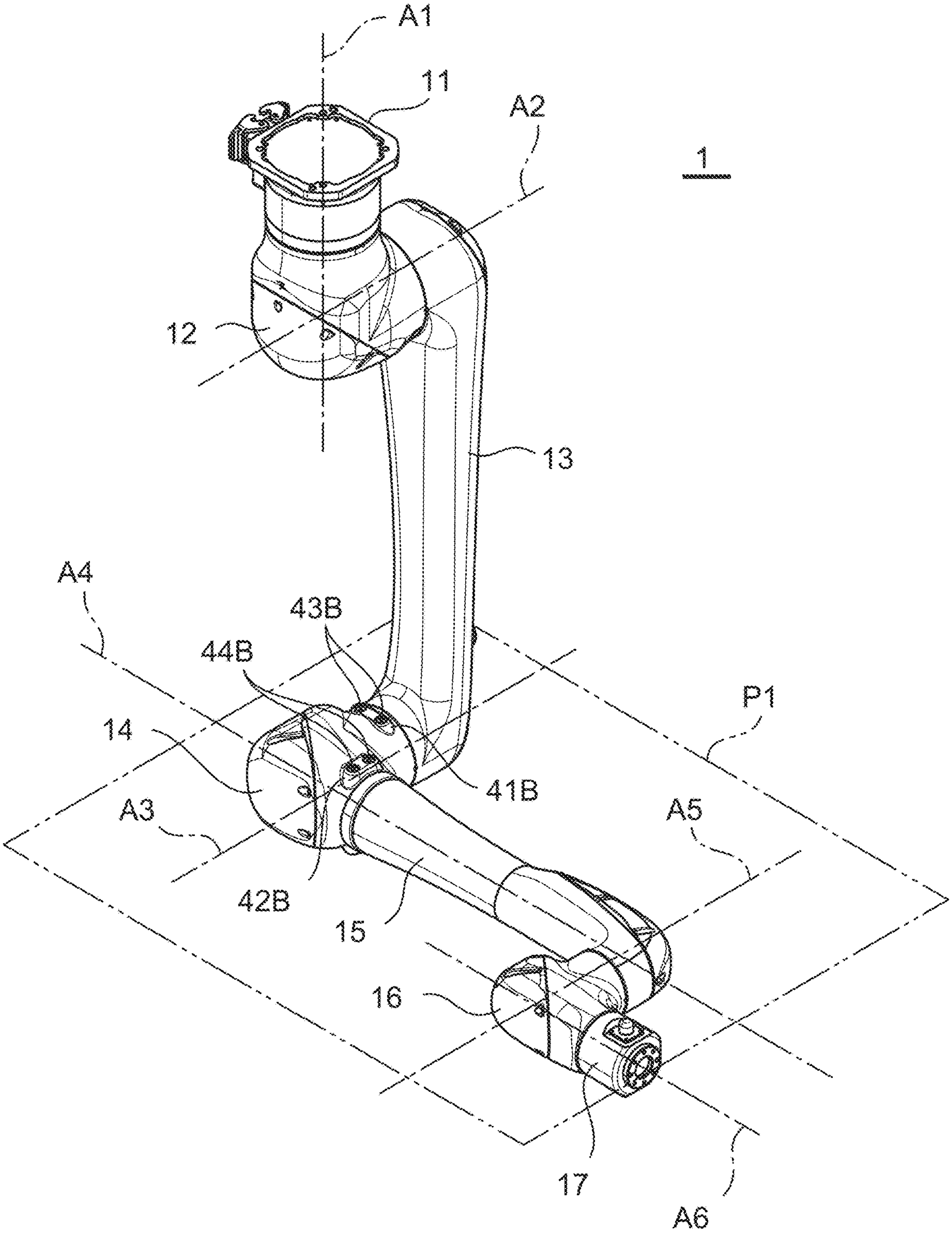

FIG. 1A and FIG. 1B are perspective views of a collaborative robot 1 according to the present embodiment. The collaborative robot 1 is an articulated robot including, as illustrated in FIG. 1A, a base 11 fixed on a floor surface (not illustrated), and a turning base 12 pivotally attached to the base 11 so as to be rotatable about a first axis A1 along a direction perpendicular to the floor surface. An output shaft of a first axis motor (not illustrated) that is fixed to the base 11 is connected to the turning base 12. Accordingly, the turning base 12 driven by the first axis motor can be rotated about the first axis A1. A first speed reducer (not illustrated) is attached to the output shaft of the first axis motor. It is noted that the first axis motor and the first speed reducer are housed inside of the base 11 and the turning base 12.

In addition, the collaborative robot 1 includes a lower arm 13 that is pivotally attached to the turning base 12 so as to be rotatable about a second axis A2, and a shoulder 14 that is pivotally attached to the lower arm 13 so as to be rotatable about a third axis A3 that is parallel to the second axis A2. A proximal end of the lower arm 13 is pivotally attached to the turning base 12 so as to be rotatable about the second axis A2 via a second axis motor (not illustrated). Here, although the second axis A2 is an axis perpendicular to the first axis A1, one of these two orthogonal axes may be offset and these axes may have a twisted positional relationship with respect to each other. By the power of the second axis motor, the lower arm 13 rotates about the second axis A2 with respect to the turning base 12. The second axis motor is housed inside of the turning base 12. A second speed reducer (not illustrated) is attached to an output shaft of the second axis motor. The lower arm 13 is a cylindrical case and includes various cables (not illustrated) inserted therethrough.

A portion of the shoulder 14 is pivotally attached to the lower arm 13 so as to be rotatable about the third axis A3 via a third axis motor (not illustrated). By the power of the third axis motor, the shoulder 14 rotates about the third axis A3 with respect to the lower arm 13. The third axis motor is housed inside of the shoulder 14. A third speed reducer 33 (not illustrated) is attached to an output shaft of the third axis motor.

In addition, the collaborative robot 1 includes an upper arm 15 that is pivotally attached to the shoulder 14 so as to be rotatable about a fourth axis A4 along the longitudinal direction, a support arm 16 that is pivotally attached so as to be rotatable about a fifth axis A5 perpendicular to the fourth axis A4 at a distal end portion of the upper arm 15, and a distal end member 17 that is rotatable about a sixth axis A6 along the longitudinal direction with respect to the support arm 16. Here, the lower arm 13, the shoulder 14, the upper arm 15, and the support arm 16 are made of metal, for example, a casting of cast iron or an aluminum alloy casting.

The proximal end of the upper arm 15 is pivotally attached to the shoulder 14 so as to be rotatable about the fourth axis A4 via a fourth axis motor (not illustrated). Here, although the fourth axis A4 is an axis perpendicular to the third axis A3, one of these two orthogonal axes may be offset and these axes may have a twisted positional relationship with respect to each other. By the power of the fourth axis motor, the upper arm 15 rotates about the fourth axis A4 with respect to the shoulder 14. The fourth axis motor is housed inside of the shoulder 14. A fourth speed reducer (not illustrated) is attached to an output shaft of the fourth axis motor.

A portion of the support arm 16 is pivotally attached to the upper arm 15 so as to be rotatable about the fifth axis A5 via a fifth axis motor (not illustrated). Here, although the fifth axis A5 is an axis perpendicular to the fourth axis A4, one of these two orthogonal axes may be offset and these axes may have a twisted positional relationship with respect to each other. By the power of the fifth axis motor, the support arm 16 rotates about the fifth axis A5 with respect to the upper arm 15. The fifth axis motor is housed inside of the shoulder 14. A fifth speed reducer (not illustrated) is attached to an output shaft of the fifth axis motor.

The distal end member 17 is pivotally attached to the support arm 16 so as to be rotatable about the sixth axis A6 via a sixth axis motor (not illustrated). Here, although the sixth axis A6 is an axis perpendicular to the fifth axis A5, one of these two orthogonal axes may be offset and these axes may have a twisted positional relationship with respect to each other. By the power of the sixth axis motor, the distal end member 17 rotates about the sixth axis A6 with respect to the support arm 16. The sixth axis motor is housed inside of the support arm 16. A sixth speed reducer (not illustrated) is attached to an output shaft of the sixth axis motor.

As described above, in the present embodiment, the collaborative robot 1 includes the first axis motor to the sixth axis motor for the driving around the axis for the first axis A1 to the sixth axis A6, respectively.

Figure 2A:
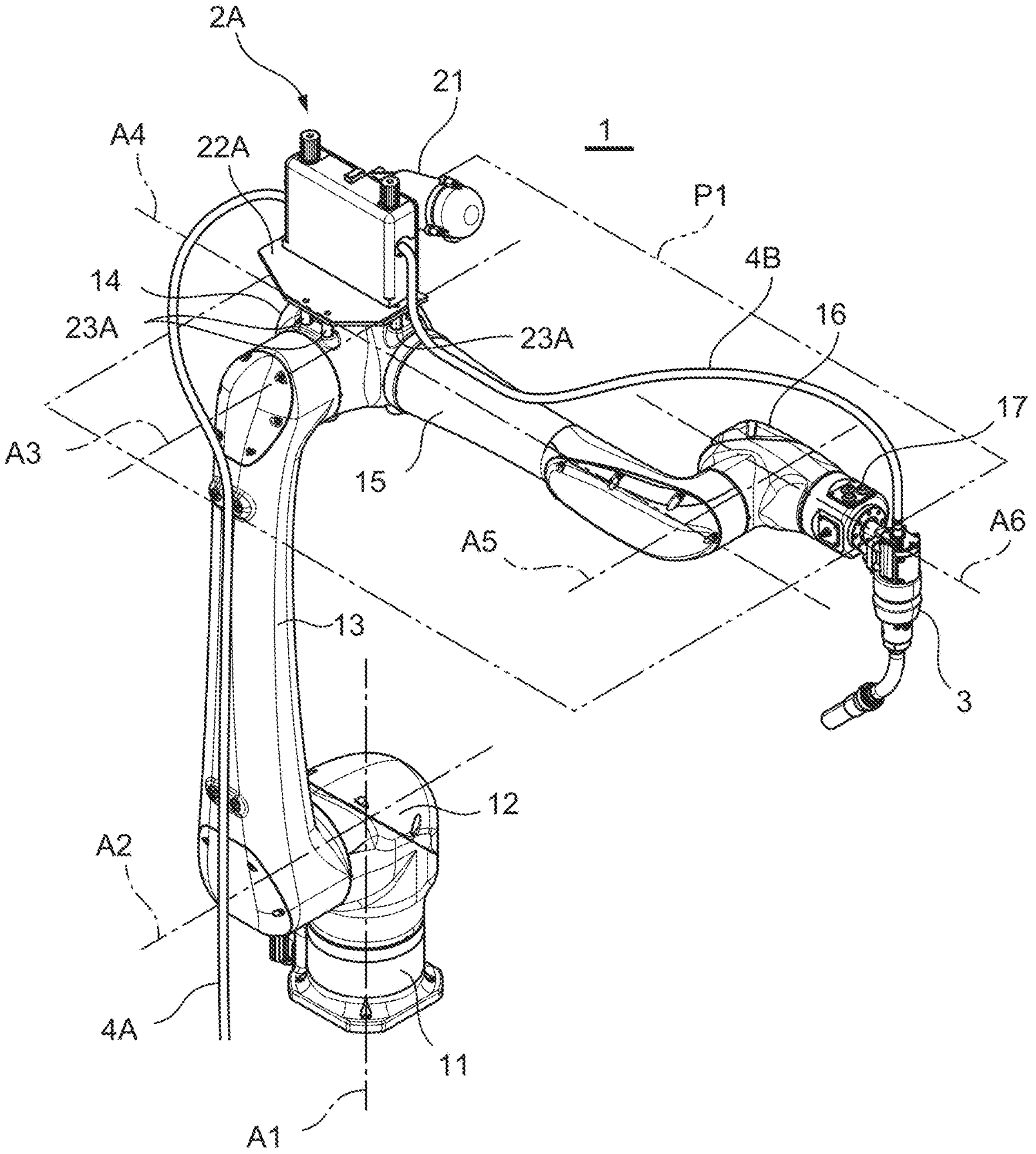
FIG. 2A and FIG. 2B are perspective views of the collaborative robot illustrated in FIG. 1A and FIG. 1B, having a wire feeding device and a welding torch attached thereto.

In addition, in the present embodiment, as illustrated in FIG. 2A (FIG. 2B), a wire feeding device 2A (2B) and a welding torch 3 for the collaborative robot 1 are attachable to the same collaborative robot 1 illustrated in FIG. 1A (FIG. 1B). In accordance with the welding operation applied to a workpiece (not illustrated) by means of the wire feeding device 2A (2B) and the welding torch 3, each arm (the lower arm 13, the upper arm 15, and the support arm 16) of the collaborative robot 1 is adapted to rotate, swing, tilt, or the like. In addition, the wire feeding device 2A (2B) is connected to a power source (not illustrated) that supplies welding power to the wire feeding device 2A (2B) and the welding torch 3 via a cable 4A, and the wire feeding device 2A is connected to the welding torch 3 via a cable 4B. The cable 4A is disposed along the lower arm 13, and fixed to the lower arm 13.

The wire feeding device 2A (2B) and the welding torch 3 are provided with welding power supplied from the power source through the cables 4A, 4B. The wire feeding device 2A (2B) includes a device body 21 that feeds a wire fed out from a wire reel (not illustrated) through the cable 4A to the welding torch 3 through the cable 4B. The device body 21 includes a plurality of rolls (not illustrated) that compresses the wire therebetween. By the friction force of these rolls, the wire is passed through the inside of the cable 4B and fed to the welding torch 3. The wire feeding device 2A includes a placement base 22A on which the device body 21 is placed, and a plurality of (four) leg portions 23A extending from the placement base 22A to mount the placement base 22A at a predetermined height from the surface of the shoulder 14. Each leg portion 23A is designed to have a length such that while an end face 23*a* of the leg portion 23A is in contact with a counterbored portion 48 (described later), the surface of the shoulder 14 and the surface of the placement base 22A are substantially parallel to each other.

As illustrated in FIG. 1A, the shoulder 14 includes raised portions 41A, 42A that are raised from the surface of the shoulder 14. The raised portion 41A extends to opposite sides of a second virtual plane P2 (described later) extending therebetween. Likewise, the raised portion 42A extends to opposite sides of a third virtual plane P3 (described later) extending therebetween. The raised portions 41A, 42A have a plurality of (two) first attachment holes 43A, 44A, respectively. The wire feeding device 2A is fixed to the shoulder 14 by being attached to the first attachment holes 43A, 44A. It is noted that the state of the wire feeding device 2A being attached to the first attachment holes 43A, 44A will be described in detail with reference to FIG. 5A (described later).

After the wire is fed from the wire feeding device 2A through the cable 4B, the welding torch 3 holds the wire such that the leading end of the wire from the cable 4B projects. The welding torch 3 is attachable to the distal end member 17, and rotates about the sixth axis A6 together with the rotation of the distal end member 17 about the sixth axis A6.

In one example, the cable 4B is a multi-layered single-line power cable (torch cable), including a conduit pipe for feeding a wire, a hose forming a passage through which shielding gas is supplied from a gas cylinder (not illustrated) along the periphery of the conduit pipe, a conductive line that covers the periphery of the hose and supplies welding power, and an outermost insulating coating.

With the multi-layer structure, the cable 4B tends to have a high flexural strength and therefore is difficult to bend. Thus, in an attempt to alleviate the difficulty in moving the welding torch 3, the cable 4B is attached while being long enough to be amply slack. Specifically, in order to allow the cable 4B to deform, the cable 4B from the wire feeding device 2A to the welding torch 3 may be placed away from the support arm 16, making allowance for some appropriate complicated deformation even when the welding torch 3 is caused to be elevated or swivel.

In addition, although FIG. 1A and FIG. 2A illustrate the collaborative robot 1 with the base 11 fixed to the floor surface, in the present embodiment, there may be a case where, as illustrated in FIG. 1B, the collaborative robot 1 is used with the base 11 fixed to the ceiling surface (not illustrated) such that the collaborative robot 1 is turned 180 degrees from the collaborative robot 1 illustrated in FIG. 1A. Hereinafter, in the present embodiment, the direction from the floor surface to the ceiling surface (not illustrated) is referred to as an upward direction and its opposite direction is referred to as a downward direction. That is, FIG. 1A illustrates the collaborative robot 1 having the shoulder 14 located at a position higher than the base 11, whereas FIG. 1B illustrates the collaborative robot 1 having the shoulder 14 located at a position lower than the base 11.

Figure 2B:
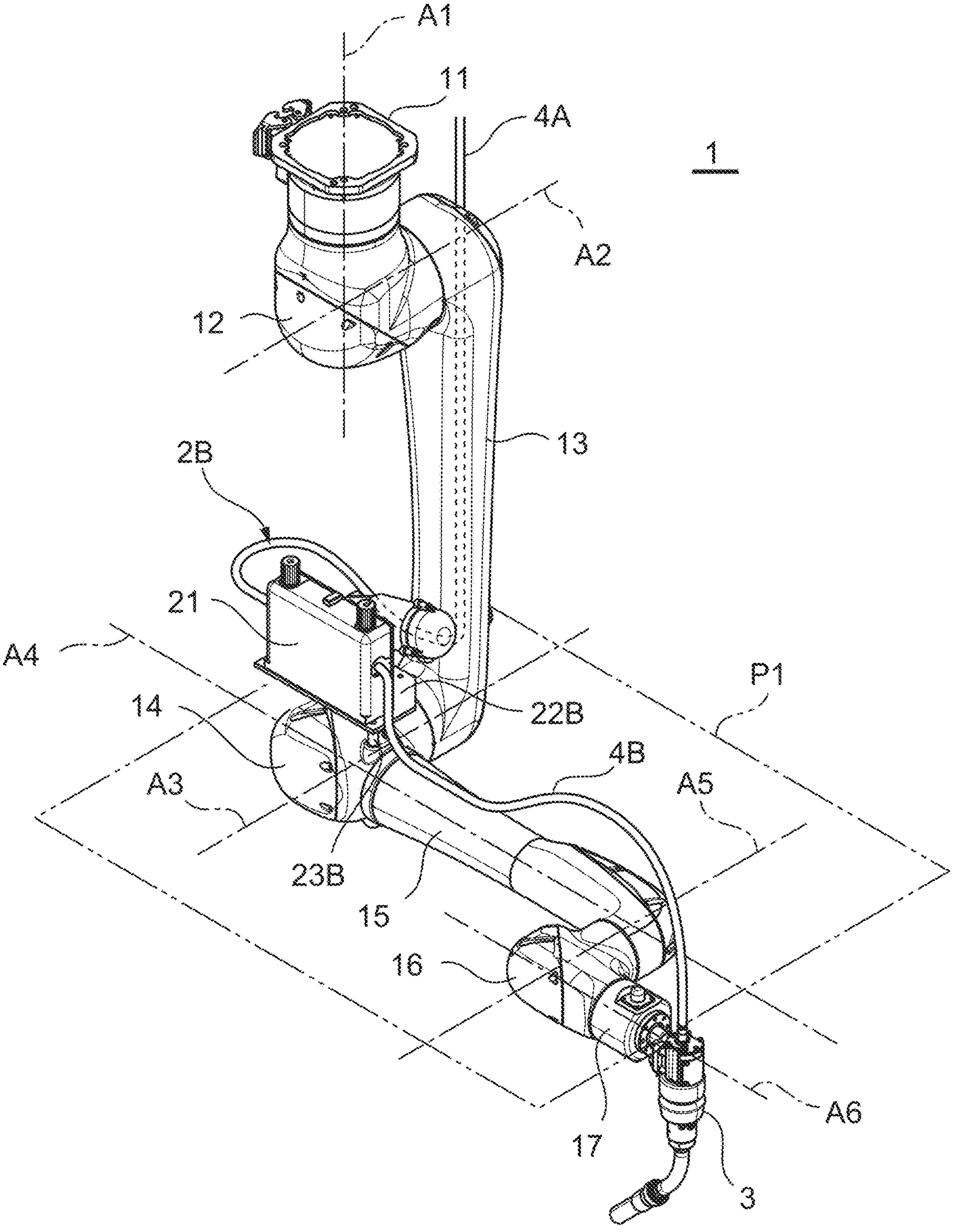

As already described, FIG. 2A illustrates the state of the wire feeding device 2A being attached to the first attachment holes 43A, 44A, whereas FIG. 2B illustrates the state of the wire feeding device 2B being attached to a plurality of (two) second attachment holes 43B, 44B respectively formed in raised portions 41B, 42B that are raised from the surface of the shoulder 14 illustrated in FIG. 1B. It is noted that the positional relationship of the first attachment holes 43A, 44A and the second attachment holes 43B, 44B (hereinafter collectively referred to as "the plurality of attachment holes") on the shoulder 14 will be described in detail later. In addition, since the device body 21 of the wire feeding device 2B is identical to the device body 21 of the wire feeding device 2A, and a placement base 22B and a leg portion 23B are identical to the placement base 22A and the leg portion 23A, description thereof will be omitted.

For simplicity of explanation, FIG. 2A and FIG. 2B illustrate the placement bases 22A, 22B as a structure that is plane-symmetric with respect to each other. However, the placement bases 22A, 22B are not limited to the structure that is plane-symmetric with respect to each other. In this case, the structure of the placement base 22A (or the placement base 22B) may be designed in accordance with the lower arm 13 or the first attachment holes 43A, 44A (or the second attachment holes 43B, 44B).

In addition, the wire feeding devices 2A, 2B correspond to the auxiliary device in the present invention, and the welding torch 3 corresponds to the end effector in the present invention. However, when the collaborative robot 1 is used for the purpose other than the welding operation, the auxiliary device and the end effector may not be limited to the wire feeding devices 2A, 2B and the welding torch 3. For example, the auxiliary device may be an air circuit or the like, and the end effector may be a suction hand (pad) or the like.

The positional relationship of the plurality of attachment holes on the shoulder 14 will be described in detail. A virtual plane including the third axis is set as a first virtual plane P1, with a line perpendicular to the third axis A3 and the fourth axis A4 being a normal line. Then, the plurality of attachment holes includes the first attachment holes 43A, 44A on one side of the shoulder 14 and the second attachment holes 43B, 44B on the other side of the shoulder 14 with the first virtual plane P1 extending therebetween. Thus, it is possible to select the plurality of attachment holes formed on the shoulder 14 and attach one of the wire feeding devices 2A, 2B to the shoulder 14 at two different positions.

Specifically, when the collaborative robot 1 is installed on the floor surface, the openings of the first attachment holes 43A, 44A face upward, and thus the wire feeding device 2A can be attached to the upper side of the shoulder 14 using the first attachment holes 43A, 44A. On the other hand, when the collaborative robot 1 is installed on the ceiling surface, the openings of the second attachment holes 43B, 44B formed on the shoulder 14 face upward, and thus the wire feeding device 2B can be attached to the upper side of the shoulder 14 using the second attachment holes 43B, 44B. As described above, by selecting either the first attachment holes 43A, 44A or the second attachment holes 43B, 44B depending on the surface (floor surface or ceiling surface) for installation of the collaborative robot 1, both of the wire feeding devices 2A, 2B can be attached to the upper side of the shoulder 14.

With the above-described configuration, whether the collaborative robot 1 is installed on the floor surface or on the ceiling surface, both of the wire feeding devices 2A, 2B may be installed on the upper side of the shoulder 14. Consequently, even when the lower arm 13 and the shoulder 14 of the collaborative robot 1 rotate about the second axis A2 and about the third axis A3, respectively, it is possible to reduce the limitation of the working space caused by the wire feeding devices 2A, 2B on the lower side of the shoulder 14. Accordingly, it is possible to ensure operator safety in working under the wire feeding devices 2A, 2B.

In addition, with the above-described configuration in which the first attachment holes 43A, 44A and the second attachment holes 43B, 44B, with the first virtual plane P1 extending therebetween, are formed on the shoulder 14, whether the collaborative robot 1 is installed on the floor surface or on the ceiling surface, the cable 4B connecting the wire feeding devices 2A, 2B and the welding torch 3 can be disposed above the upper arm 15 along the extending direction from the shoulder 14 of the upper arm 15. Thus, it is possible to prevent the cable 4B from hanging downward of the upper arm 15 and interfering with the operator or the like.

Furthermore, since both of the wire feeding devices 2A, 2B can be attached to the upper side of the shoulder 14 regardless of the surface for installation of the collaborative robot 1, it is possible to easily perform maintenance of the wire feeding devices 2A, 2B.

As already described, the first attachment holes 43A, 44A and the second attachment holes 43B, 44B, with the first virtual plane P1 extending therebetween, are formed on the shoulder 14. More specifically, the first attachment holes 43A, 44A and the second attachment holes 43B, 44B are provided at plane-symmetric positions to the first virtual plane P1 extending therebetween.

This allows the cable 4B connecting the wire feeding devices 2A, 2B and the welding torch 3 to have a substantially constant length while the wire feeding devices 2A, 2B are attached to the first attachment holes 43A, 44A or the second attachment holes 43B, 44B. Thus, between when the wire feeding device 2A is attached to the first attachment holes 43A, 44A and when the wire feeding device 2B is attached to the second attachment holes 43B, 44B, it is possible to reduce the likelihood of variations in the operability of the collaborative robot 1 resulting from the cable 4B swaying around, such as torque applied to the fifth axis motor, for example. Additionally, whether the collaborative robot 1 is installed on the floor surface or on the ceiling surface, it is possible to efficiently feed the wire from the wire feeding devices 2A, 2B to the welding torch 3 through the cable 4B.

Figure 3A:
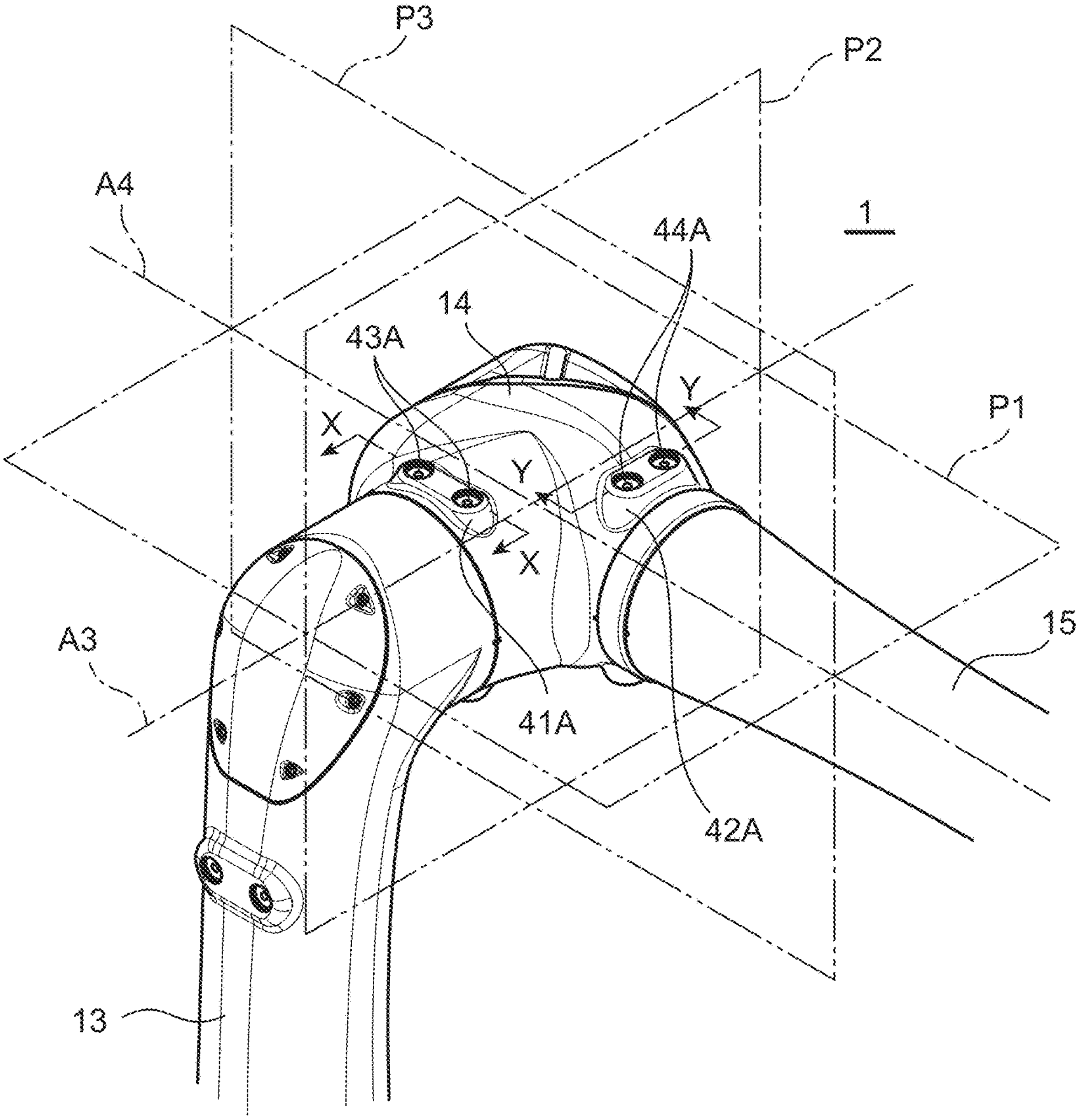
FIG. 3A is an enlarged view around a shoulder of the collaborative robot according to the present embodiment.
Figure 3B:
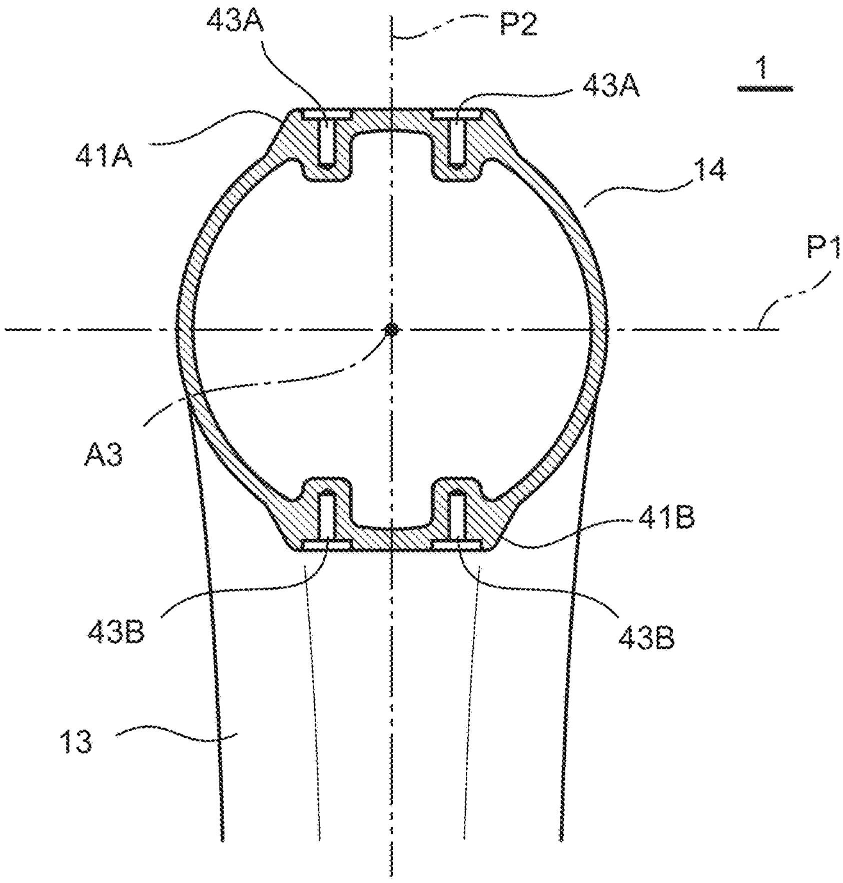
FIG. 3B is a cross-sectional view taken along X-X of FIG. 3A.
Figure 3C:
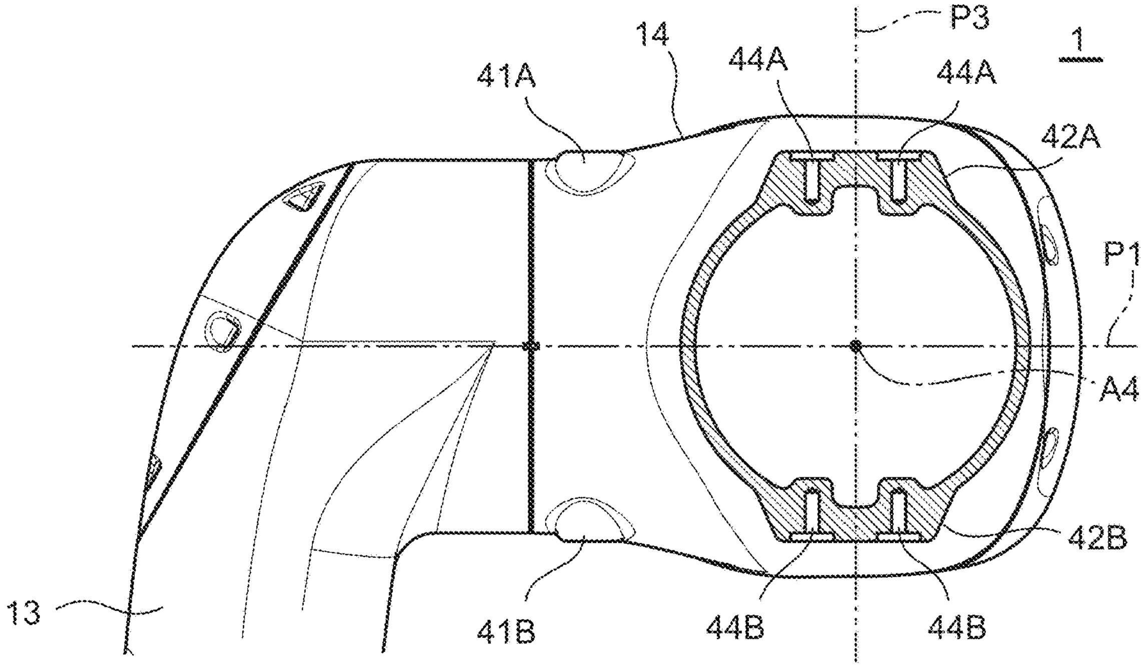
FIG. 3C is a cross-sectional view taken along Y-Y of FIG. 3A.

FIG. 3A is an enlarged view around the shoulder 14 of the collaborative robot 1 according to the present embodiment. FIG. 3B is a cross-sectional view taken along X-X of FIG. 3A, and FIG. 3C is a cross-sectional view taken along Y-Y of FIG. 3A. As illustrated in FIG. 3A and FIG. 3B, the first attachment holes 43A include a pair of attachment holes and the second attachment holes 43B include a pair of attachment holes, and the second virtual plane P2 that includes the third axis A3 and is perpendicular to the first virtual plane P1 extends between each pair of attachment holes. Furthermore, as illustrated in FIG. 3A and FIG. 3C, the first attachment holes 44A include a pair of attachment holes and the second attachment holes 44B include a pair of attachment holes, and the third virtual plane P3 that includes the fourth axis A4 and is perpendicular to the first virtual plane P1 extends between each pair of the attachment holes.

Consequently, even when the shoulder 14 and the upper arm 15 rotate about the third axis A3 and the fourth axis A4, respectively, it is possible to stably maintain the state of the wire feeding devices 2A, 2B being attached to the first attachment holes 43A, 44A or the second attachment holes 43B, 44B. It is noted that the internal structure on the cross sections of FIG. 3B and FIG. 3C is illustrated in a simplified manner, and illustration of the structure of the fourth axis motor and the like is omitted.

Figure 4A:
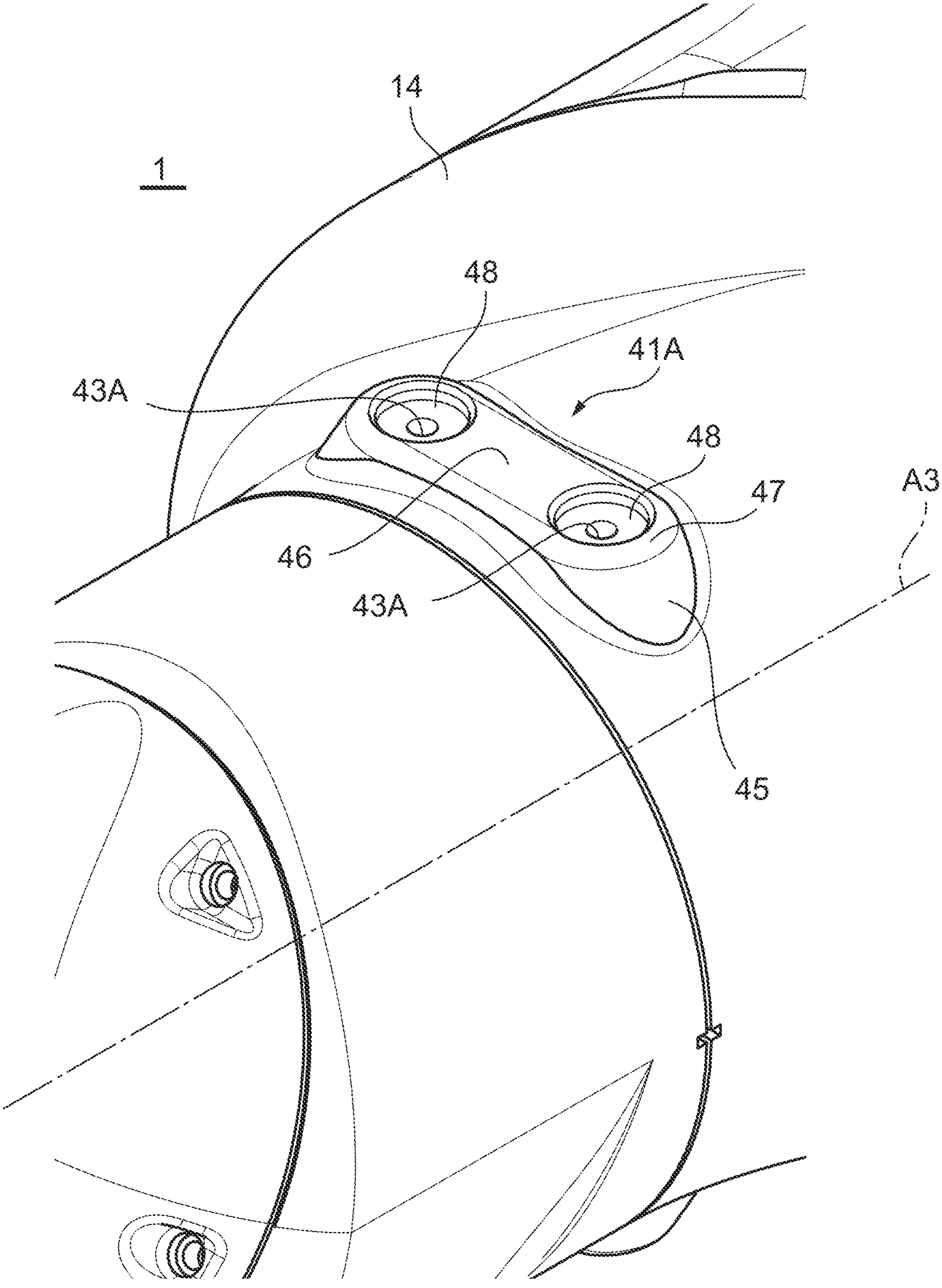
FIG. 4A is an enlarged view around a raised portion of the shoulder of the collaborative robot according to the present embodiment.
Figure 4B:
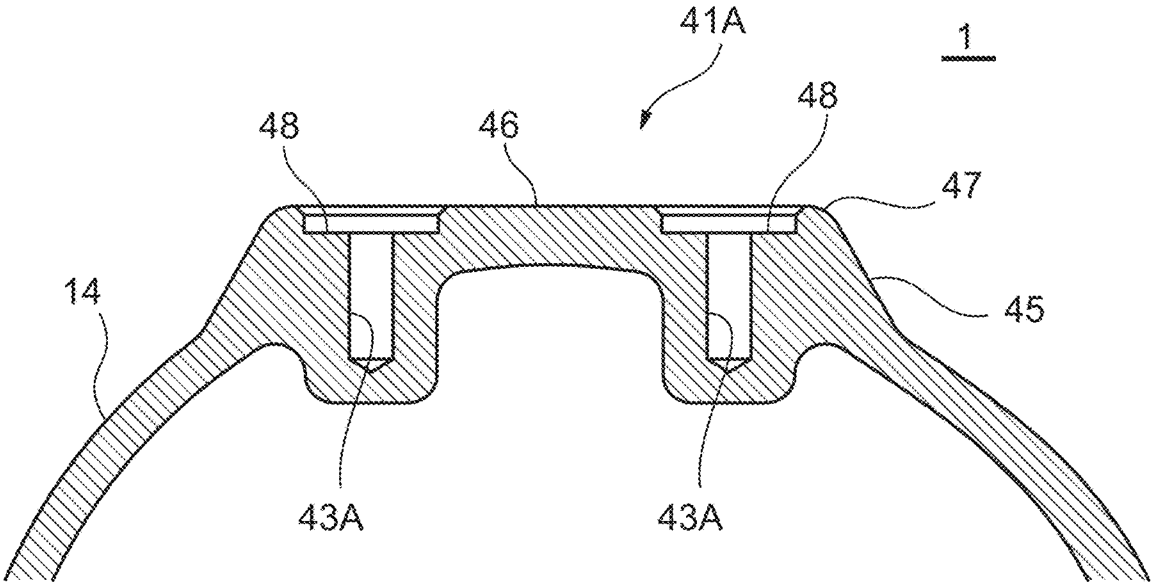
FIG. 4B is a cross-sectional view taken along X-X of FIG. 3A.
Figure 5A:
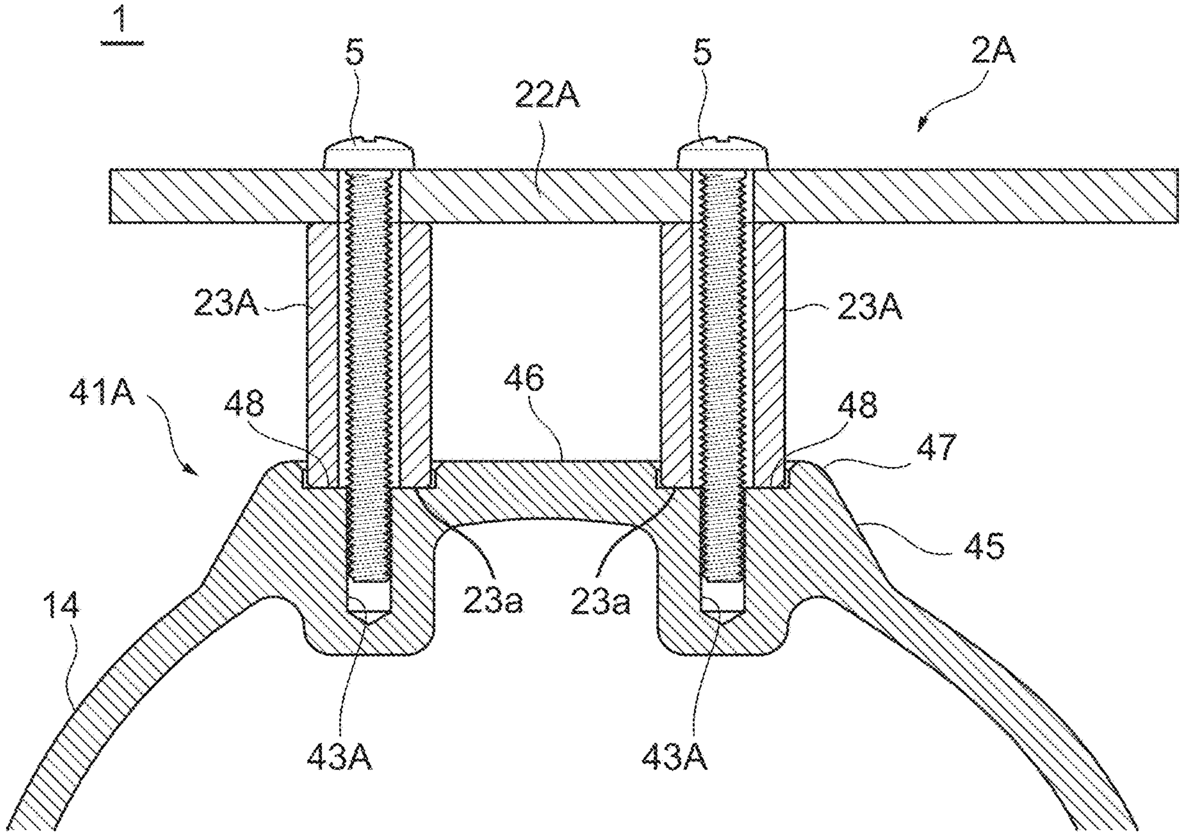
FIG. 5A is a cross-sectional view of a main part for describing a state of the wire feeding device being attached to the raised portion of the collaborative robot with the base fixed to the floor surface as illustrated in FIG. 2A, the cross-sectional view taken along X-X of FIG. 3A.
Figure 5B:
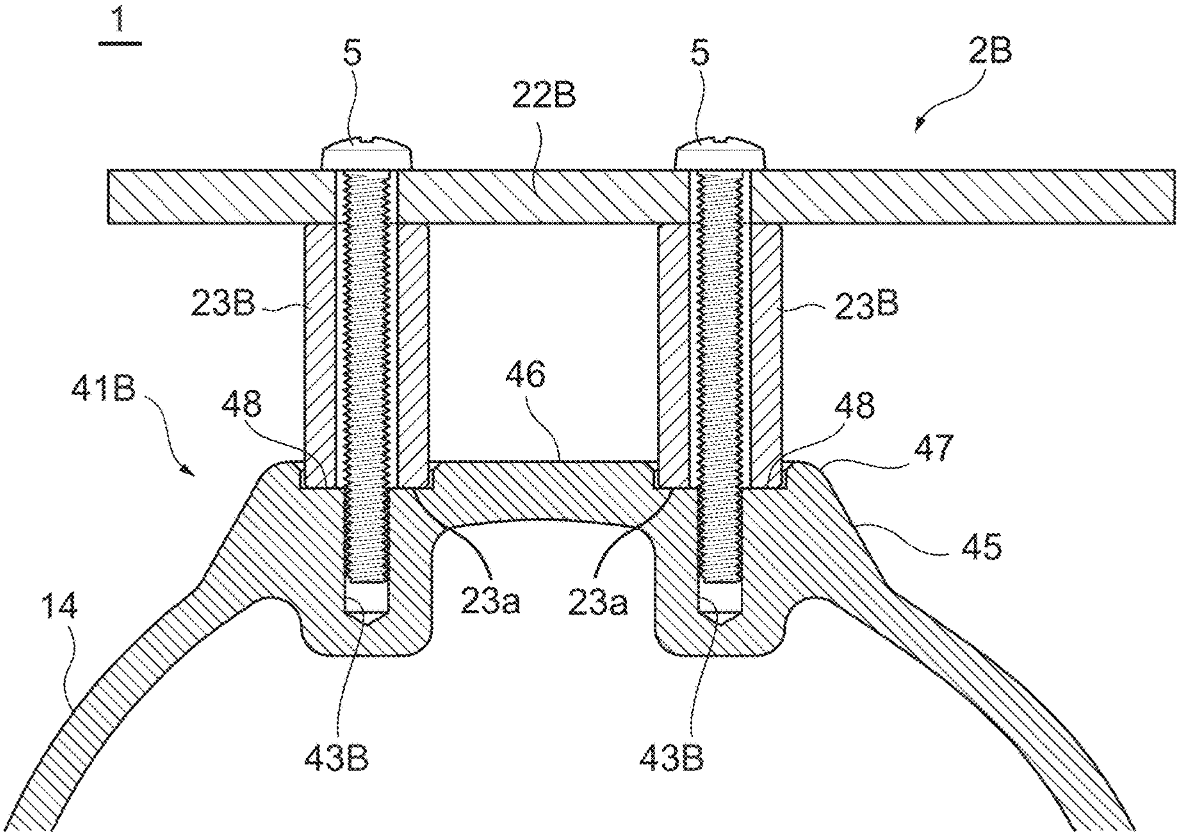
FIG. 5B is a cross-sectional view of a main part for describing a state of the wire feeding device being attached to the raised portion of the collaborative robot with the base fixed to the ceiling surface as illustrated in FIG. 2B, the cross-sectional view taken salong X-X of FIG. 3A.

FIG. 4A is an enlarged view around the raised portion 41A of the shoulder 14 of the collaborative robot 1 according to the present embodiment. FIG. 4B is a cross-sectional view taken along X-X of FIG. 3A. FIG. 5A is a cross-sectional view of a main part for describing a state of the wire feeding device 2A being attached to the raised portion 41A of the collaborative robot 1 with the base 11 fixed to the floor surface as illustrated in FIG. 2A, the cross-sectional view taken along X-X of FIG. 3A. FIG. 5B is a cross-sectional view of a main part for describing a state of the wire feeding device 2B being attached to the raised portion 41B of the collaborative robot 1 with the base 11 fixed to the ceiling surface as illustrated in FIG. 2B, the cross-sectional view taken along X-X of FIG. 3A. In the following, the configuration of the raised portion 41A and the method of attaching the wire feeding device 2A to the first attachment holes 43A (description of the first attachment holes 44A will be omitted) of the raised portion 41A will be described with reference to FIG. 5A. Likewise, the configuration of the raised portion 41B and the method of attaching the wire feeding device 2B to the second attachment holes 43B (description of the first attachment holes 44B will be omitted) of the raised portion 41B will be described with reference to FIG. 5B.

As illustrated in FIG. 5A and FIG. 5B, the shoulder 14 is, for example, a casting of cast iron or an aluminum alloy casting with the raised portions 41A, 41B that are raised from the surface of the shoulder 14. To form the first attachment holes 43A and the second attachment holes 43B, firstly, the surface conditions of molds are transferred to the raised portions 41A, 41B as cast, so that side surfaces 45 and top surfaces 46 as casting surfaces of the raised portions 41A, 41B are formed. At this time, boundary portions 47 that are rounded are also formed at the each of boundaries between the side surface 45 and the top surface 46. Next, a recess is formed at each of two positions of the top surface 46 using a drill or the like, and then cutting is performed using an end mill or the like, thereby forming counterbored portions 48 that are flat. Finally, holes for inserting fixing members 5 are drilled near the center of the counterbored portions 48. These holes become the first attachment holes 43A and the second attachment holes 43B.

The first attachment holes 43A and the second attachment holes 43B are formed through the above-described process. Since the counterbored portions 48 are formed in a portion of the top surfaces 46 while the side surfaces 45 and the top surfaces 46 as the casting surfaces are left, the edge of the cutting surface will not be sharp as compared to the case where the entire upper surfaces of the raised portions 41A, 41B are cut without forming the counterbored portions 48 beforehand. As a result, while the collaborative robot 1 is operating, it is possible to ensure operator safety when in contact with the raised portions 41A, 41B.

In addition, all of the leg portions 23A, 23B of the wire feeding devices 2A, 2B have a cylindrical structure respectively, and each of the leg portions 23A, 23B extends from each of the placement bases 22A, 22B such that the opening of the hole formed to penetrate each of the placement bases 22A, 22B overlaps an opening of hollow portions of the leg portions 23A, 23B respectively.

To attach the wire feeding device 2A to the first attachment holes 43A of the raised portion 41A, the wire feeding device 2A is disposed such that, of the openings of the hollow portions of the leg portions 23A, the opening that does not overlap the opening of the hole formed on the placement base 22A overlaps the opening of the first attachment holes 43A and also one end of the leg portions 23A contacts the counterbored portions 48. After that, the fixing members 5 are passed through the holes formed on the placement base 22A and the hollow portions of the leg portions 23A from the side of the placement base 22A, and then inserted into the first attachment holes 43A. Consequently, the wire feeding device 2A is attached to the first attachment holes 43A. Likewise, to attach the wire feeding device 2B to the second attachment holes 43B of the raised portion 41B, the wire feeding device 2B is disposed such that, of the openings of the hollow portions of the leg portions 23B, the opening that does not overlap the opening of the hole formed on the placement base 22B overlaps the opening of the second attachment holes 43B and also one end of the leg portions 23B contacts the counterbored portions 48. After that, the fixing members 5 are passed through the holes formed on the placement base 22B and the hollow portions of the leg portions 23B from the side of the placement base 22B, and then inserted into the second attachment holes 43B. Consequently, the wire feeding device 2B is attached to the second attachment holes 43B. It is noted that in FIG. 5A and FIG. 5B, illustration of the device body 21 is omitted. Here, in one example, the fixing member 5 is an external thread, and the holes formed on each of the placement bases 22A, 22B, the hollow portions of the leg portions 23A, 23B, and the first attachment holes 43A, the second attachment holes 43B are female threads formed by threading.

Since the casting surface is not flat, whereas the counterbored portion 48 is flat, the ends of the plurality of leg portions 23A, 23B can made uniformly in contact with the counterbored portions 48. In addition, since each of the plurality of leg portions 23A, 23B uniformly contacts the counterbored portion 48, the attitude of the wire feeding device 2A, 2B being attached to each of the first attachment holes 43A and the second attachment holes 43B is stable. More specifically, by setting the length of the leg portion 23A,23B in accordance with the distance from the counterbored portion 48 to each of the placement base 22A, 22B, the attitude of each of the wire feeding device 2A, 2B being attached to each of the first attachment holes 43A and the second attachment holes 43B can be stable, and the attachment accuracy can be ensured.

Although the embodiment of the present invention has been described in detail above, the present invention is not limited to the foregoing embodiment, and various design changes are possible in so far as they are within the spirit of the present invention in the scope of the claims.

What is claimed is:

1. A collaborative robot, comprising:

a turning base that is pivotally attached to a base so as to be rotatable about a first axis;

a lower arm that is pivotally attached to the turning base so as to be rotatable about a second axis;

a shoulder that is pivotally attached to the lower arm so as to be rotatable about a third axis that is parallel to the second axis;

an upper arm that is pivotally attached to the shoulder so as to be rotatable about a fourth axis along a longitudinal direction;

a support arm that is pivotally attached so as to be rotatable about a fifth axis perpendicular to the fourth axis at a distal end portion of the upper arm; and a distal end member that is rotatable about a sixth axis along a longitudinal direction with respect to the support arm, wherein an end effector is attachable to the distal end member, an auxiliary device is connected to the end effector via a cable disposed along the upper arm, a virtual plane including the third axis is set as a first virtual plane, with a line perpendicular to the third axis and the fourth axis being a normal line, in the collaborative robot, the shoulder includes a plurality of attachment holes for attaching the auxiliary device at two different positions, the plurality of attachment holes includes a plurality of first attachment holes on one side of the shoulder and a plurality of second attachment holes on another side of the shoulder with the first virtual plane extending therebetween, and the auxiliary device is attached to either the plurality of first attachment holes or the plurality of second attachment holes.

2. The collaborative robot according to claim 1, wherein the plurality of first attachment holes and the plurality of second attachment holes are provided at plane-symmetric positions to the first virtual plane extending therebetween.

3. The collaborative robot according to claim 2, wherein the plurality of first attachment holes and the plurality of second attachment holes each include a pair of attachment holes between which a second virtual plane that includes the third axis and is perpendicular to the first virtual plane extends, and a pair of attachment holes between which a third virtual plane that includes the fourth axis and is perpendicular to the first virtual plane extends.

4. The collaborative robot according to claim 1, wherein the shoulder is a casting with a raised portion that is raised from a surface of the shoulder, the raised portion includes a side surface and a top surface that are casting surfaces, the raised portion includes a boundary portion between the side surface and the top surface, the boundary portion being rounded, the raised portion includes a counterbored portion on the top surface thereof, and the plurality of attachment holes is formed in the counterbored portion.

* * * * *